US012656454B2

(12) United States Patent
Matsumoto

(10) Patent No.: US 12,656,454 B2
(45) Date of Patent: Jun. 16, 2026

(54) INFORMATION PROCESSING DEVICE AND INFORMATION PROCESSING METHOD

(71) Applicant: SONY GROUP CORPORATION, Tokyo (JP)

(72) Inventor: Toshihiro Matsumoto, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 423 days.

(21) Appl. No.: 18/252,260

(22) PCT Filed: Oct. 19, 2021

(86) PCT No.: PCT/JP2021/038554
§ 371 (c)(1),
(2) Date: May 9, 2023

(87) PCT Pub. No.: WO2022/107532
PCT Pub. Date: May 27, 2022

(65) Prior Publication Data
US 2024/0012108 A1        Jan. 11, 2024

(30) Foreign Application Priority Data

Nov. 17, 2020    (JP) ................................. 2020-191131

(51) Int. Cl.
*G01S 7/40*        (2006.01)
*G01S 13/36*        (2006.01)
*G01S 13/931*        (2020.01)

(52) U.S. Cl.
CPC .......... *G01S 7/4021* (2013.01); *G01S 7/4017* (2013.01); *G01S 13/36* (2013.01); *G01S 13/931* (2013.01)

(58) Field of Classification Search
None
See application file for complete search history.

(56) References Cited

U.S. PATENT DOCUMENTS

2008/0204311 A1*    8/2008    Fujimura ............ G01S 13/9054
                                                                342/25 B
2019/0391249 A1*    12/2019    Takeuchi .............. G01S 13/536

FOREIGN PATENT DOCUMENTS

CN            111381215 A        7/2020
JP            57-097704 A        6/1982
                    (Continued)

OTHER PUBLICATIONS

International Search Report and Written Opinion of PCT Application No. PCT/JP2021/038554, issued on Nov. 22, 2021, 12 pages of ISRWO.

*Primary Examiner* — Whitney Moore
(74) *Attorney, Agent, or Firm* — CHIP LAW GROUP

(57) ABSTRACT

An information processing apparatus includes a generation unit that generates a calibration parameter on the basis of a phase difference vector and a reference phase difference vector that is a reference, where the phase difference vector is calculated on the basis of a sensing result, the sensing result is measured by a distance measurement sensor, the distance measurement sensor includes a plurality of first reception antennas and one or more transmission antennas, the plurality of first reception antennas includes a reference reception antenna and one or more second reception antennas, and the phase difference vector is a phase difference vector between the reference reception antenna and each of the one or more second reception antennas.

17 Claims, 7 Drawing Sheets

(56)                    References Cited

FOREIGN PATENT DOCUMENTS

| | | | |
|---|---|---|---|
| JP | 2001-166029 | A | 6/2001 |
| JP | 2008-203228 | A | 9/2008 |
| JP | 2009-281775 | A | 12/2009 |
| JP | 2011-127910 | A | 6/2011 |
| JP | 2020-024185 | A | 2/2020 |
| JP | 2020-026955 | A | 2/2020 |

* cited by examiner

54(54L)

115

1

54(54R)

110

120

127

Parameter
generation unit

115

Tx1 Rx11 Rx12 Rx13 Rx14      Tx2 Rx21 Rx22 Rx23 Rx24

54L       54R

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2021/038554 filed on Oct. 19, 2021, which claims priority benefit of Japanese Patent Application No. JP 2020-191131 filed in the Japan Patent Office on Nov. 17, 2020. Each of the above-referenced applications is hereby incorporated herein by reference in its entirety.

TECHNICAL FIELD

The present technology relates to an information processing apparatus, an information processing method, and a program that can be applied to calibration.

BACKGROUND ART

A calibration apparatus described in Patent Literature 1 is mounted on a vehicle and detects relative positions with respect to a plurality of targets arranged spaced apart from each other at reference intervals. Based on the reference intervals, changes in relative positions of the targets are detected from detection data detected during the driving of the vehicle. This suitably calibrates a sensor for detecting a relative position with respect to a vehicle that is a target (paragraphs [0028] and [0091], FIG. 1, and the like in Patent Literature 1).

PATENT LITERATURE

Patent Literature 1: Japanese Patent Application Laid-open No. 2020-26955

DISCLOSURE OF INVENTION

Technical Problem

In such sensor calibration, it is desirable to provide a technology that can enhance calibration accuracy.

In view of the above-mentioned circumstances, it is an objective of the present technology to provide an information processing apparatus, an information processing method, and a program that can enhance calibration accuracy.

Solution to Problem

In order to accomplish the above-mentioned objective, an information processing apparatus according to an embodiment of the present technology includes a generation unit.

The generation unit generates a calibration parameter on the basis of a phase difference vector and a reference phase difference vector that is a reference, the phase difference vector being calculated on the basis of a sensing result, the sensing result being measured by a distance measurement sensor, the distance measurement sensor including a plurality of reception antennas and one or more transmission antennas, the plurality of reception antennas including a reference reception antenna and one or more other reception antennas, the phase difference vector being a phase difference vector between the reference reception antenna and each of the one or more other reception antennas.

In this information processing apparatus, the calibration parameter is generated on the basis of the phase difference vector between the reference reception antenna and each of the one or more other reception antennas, which is calculated on the basis of the sensing result measured by the distance measurement sensor, and the reference phase difference vector that is the reference. This configuration can enhance calibration accuracy.

The sensing result may include measurement data that is a target to be used for calibration.

The information processing apparatus may further include an estimation unit that estimates a coming direction of a sending wave, the sending wave being sent from the transmission antenna, reflected on the target, and received by at least one of the plurality of reception antennas.

The generation unit may generate the calibration parameter by projecting the phase difference vector on the reference phase difference vector.

The information processing apparatus may further include a calculation unit that calculates a relative position between the target and each of the plurality of reception antennas.

The calculation unit may convert the relative position of each of the plurality of reception antennas on a coordinate axis of the distance measurement sensor.

The information processing apparatus may further include an execution unit that executes calibration on the basis of the calibration parameter.

The distance measurement sensor may be mounted on a mobile apparatus.

The generation unit may generate the calibration parameter on the basis of the phase difference vector and the reference phase difference vector, the phase difference vector being calculated on the basis of a plurality of sensing results from which the distance measurement sensor measures a plurality of targets.

The measurement data may be a plurality of pieces of measurement data from which a positional relationship between the distance measurement sensor and the target is acquired in different positional relationships.

The calibration parameter may at least include a parameter relating to a relative position and a relative angle of the distance measurement sensor with respect to a target to be measured.

The calibration parameter may at least include parameters of six axes relating to relative positions of three axis directions of the distance measurement sensor and relative angles of the three axes, the three axis directions being orthogonal to one another.

The distance measurement sensor may send radio waves at extremely high frequencies (EHF) from the transmission antenna.

The target may be in a still state.

Relative position information of the target with respect to a reference point for calibration may be unknown.

The target may have a distance to the distance measurement sensor where aliasing due to phase difference characteristics occurs.

An information processing method according to an embodiment of the present technology is an information processing method executed by a computer system and includes by a computer system generating a calibration parameter on the basis of a phase difference vector and a reference phase difference vector that is a reference, the phase difference vector being calculated on the basis of a sensing result, the sensing result being measured by a distance measurement sensor, the distance measurement sensor including a plurality of reception antennas and one or more transmission antennas, the plurality of reception antennas including a reference reception antenna and one or more other reception antennas, the phase difference vector being a phase difference vector between the reference reception antenna and each of the one or more other reception antennas.

A program according to an embodiment of the present technology causes a computer system to execute the following step.

A step of generating a calibration parameter on the basis of a phase difference vector and a reference phase difference vector that is a reference, the phase difference vector being calculated on the basis of a sensing result, the sensing result being measured by a distance measurement sensor, the distance measurement sensor including a plurality of reception antennas and one or more transmission antennas, the plurality of reception antennas including a reference reception antenna and one or more other reception antennas, the phase difference vector being a phase difference vector between the reference reception antenna and each of the one or more other reception antennas.

MODE(S) FOR CARRYING OUT THE INVENTION

Hereinafter, embodiments according to the present technology will be described with reference to the drawings.

[Configuration Example of Vehicle Control System]

Figure 1:
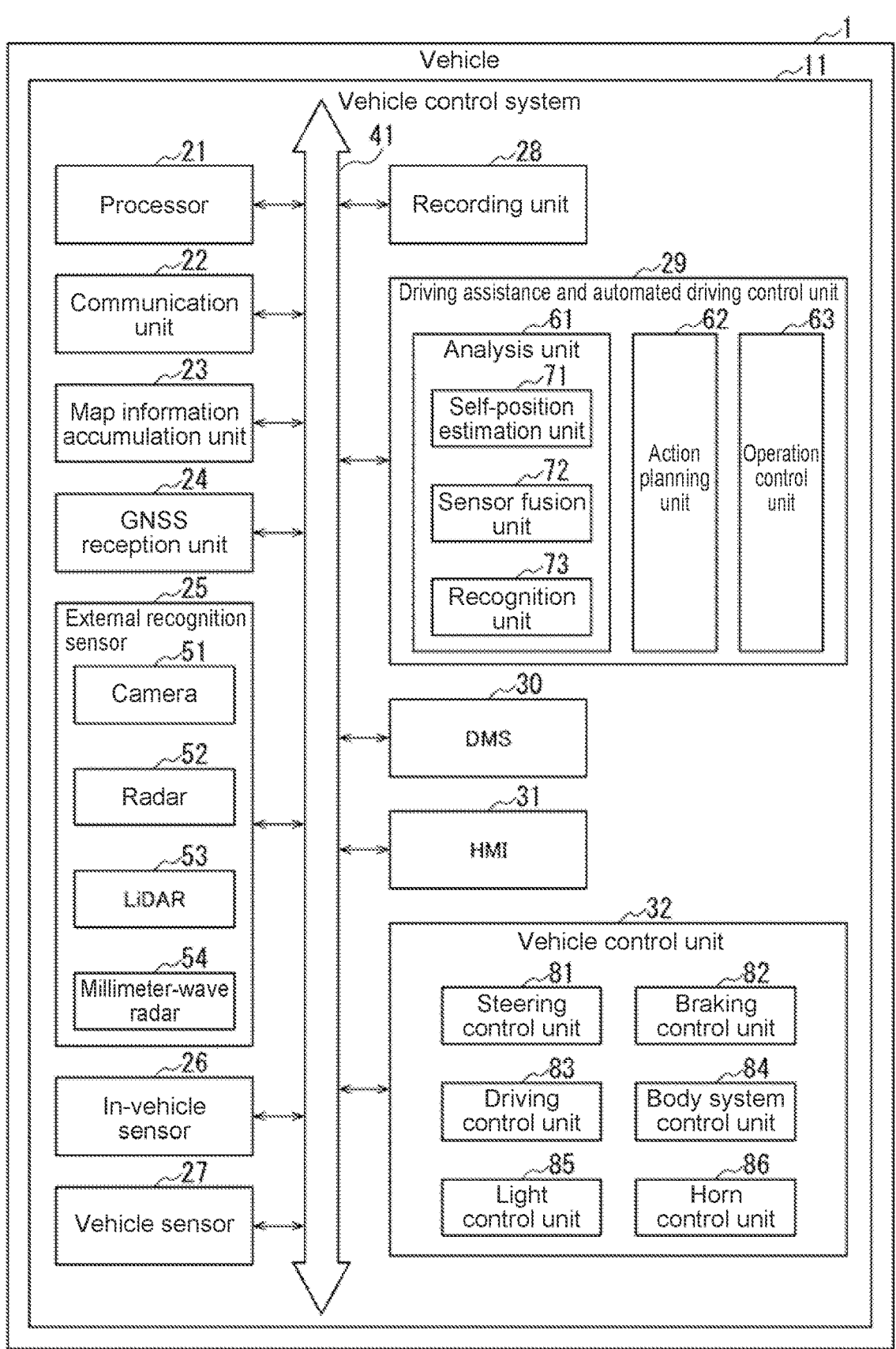
FIG. 1 A block diagram showing a configuration example of a vehicle control system.

FIG. 1 is a block diagram showing a configuration example of a vehicle control system 11 according to the present technology.

The vehicle control system 11 includes a vehicle control electronic control unit (ECU) 21, a communication unit 22, a map information storage unit 23, a global navigation satellite system (GNSS) reception unit 24, an external recognition sensor 25, an in-vehicle sensor 26, a vehicle sensor 27, a recording unit 28, a driving assistance and automated driving control unit 29, a driver monitoring system (DMS) 30, a human machine interface (HMI) 31, and a vehicle control unit 32.

The vehicle control ECU 21, the communication unit 22, the map information storage unit 23, the GNSS reception unit 24, the external recognition sensor 25, the in-vehicle sensor 26, the vehicle sensor 27, the recording unit 28, the driving assistance and automated driving control unit 29, the driver monitoring system (DMS) 30, the human machine interface (HMI) 31, and the vehicle control unit 32 are connected to be capable of communicating with each other via a communication network 41.

The communication network 41 is for example constituted by a vehicle-mounted communication network, a bus, and the like that are compatible for standards for digital bidirectional communication, such as a controller area network (CAN), a local interconnect network (LIN), a local area network (LAN), FlexRay (registered trademark), and Ethernet (registered trademark). The communication network 41 may be used depending on the type of data to be communicated. For example, the CAN is applied for data relating to vehicle control and the Ethernet is applied for large-volume data.

It should be noted that the respective units of the vehicle control system 11 may be directly connected by wireless communication assuming relatively short-distance communication, for example, near-field communication (near field communication (NFC)) and Bluetooth (registered trademark), without using the communication network 41.

It should be noted that hereinafter, in a case where the respective units of the vehicle control system 11 perform communication via the communication network 41, the description of the communication network 41 will be omitted. For example, in a case where the vehicle control ECU 21 and the communication unit 22 perform communication via the communication network 41, it will be simply expressed: "the processor 21 and the communication unit 22 perform communication".

The vehicle control ECU 21 is constituted by various processors, for example, a central processing unit (CPU) and a micro processing unit (MPU). The vehicle control ECU 21 controls all or some functions of the vehicle control system 11.

The communication unit 22 performs communication various apparatuses inside and outside the vehicle, other vehicles, servers, base stations, and the like and transmits and receives various types of data. At this time, the communication unit 22 is capable of communication by using a plurality of communication schemes.

Communication with the outside of the vehicle that the communication unit 22 can perform will be described schematically. In accordance with for example a wireless communication method such as a fifth-generation mobile communications system (5G), long term evolution (LTE), and dedicated short range communications (DSRC), the communication unit 22 performs communication with a server or the like (hereinafter, referred to as external server) in an external network via a base station or access point. The external network in which the communication unit 22 performs communication is for example the Internet, a cloud network, or a company-specific network, or the like. A communication scheme by which the communication unit 22 performs communication in the external network is not particularly limited as long as it can perform digital bidirectional communication at a predetermined communication speed or more and a predetermined distance or more.

Moreover, for example, the communication unit 22 is capable of performing communication with a terminal located near the self-vehicle by using a peer to peer (P2P) technology. The terminal located near the self-vehicle is for example a terminal mounted on a movable object that moves at a relatively low speed, such as a pedestrian and a bicycle, a terminal installed at a fixed position in a store or the like, or a machine type communication (MTC) terminal. In addition, the communication unit 22 is also capable of performing V2X communication.

The V2X communication refers to communication between the self-vehicle and other objects, for example, vehicle-to-vehicle communication with other vehicles, vehicle-to-infrastructure communication with road-side units and the like, vehicle-to-home communication with houses, and vehicle-to-pedestrian communication with terminals and the like that pedestrians possess.

The communication unit 22 is capable of receiving a program for updating software to control the operation of the vehicle control system 11, for example, from the outside (over the air). The communication unit 22 is also capable of receiving map information, traffic information, surrounding information of a vehicle 1, and the like from the outside. Moreover, for example, the communication unit 22 is capable of sending information about the vehicle 1, surrounding information of the vehicle 1, and the like to the outside.

Examples of the information about the vehicle 1 that the communication unit 22 sends to the outside includes data indicating a state of the vehicle 1, a recognition result of a recognition unit 73, and the like. Further, for example, the communication unit 22 performs communication compatible to a vehicle emergency alert system, such as eCall.

Communication with the inside of the vehicle that the communication unit 22 can perform will be described schematically. The communication unit 22 is capable of performing communication with each in-vehicle apparatus by using wireless communication for example. The communication unit 22 is capable of performing wireless communication with the in-vehicle apparatus by a communication scheme capable of digital bidirectional communication at a predetermined communication speed or more, wireless communication such as a wireless LAN, Bluetooth, NFC, or wireless USB (WUSB).

The present technology is not limited thereto, and the communication unit 22 is also capable of performing communication with each in-vehicle apparatus by using wired communication. For example, the communication unit 22 is capable of performing communication with each in-vehicle apparatus by wired communication via a cable connected to a connection terminal (not shown). The communication unit 22 is capable of performing communication with each in-vehicle apparatus by a communication scheme capable of digital bidirectional communication at a predetermined communication speed or more by wired communication such as a universal serial bus (USB), a high-definition multimedia interface (HDMI) (registered trademark), and a mobile high-definition link (MHL).

Here, the in-vehicle apparatus refers to, for example, an apparatus not connected to the communication network 41 inside the vehicle. Examples of the in-vehicle apparatus includes a mobile device and a wearable device that a passenger such as a driver possesses, an information device carried in the vehicle and temporarily installed, and the like.

For example, the communication unit 22 receives electromagnetic waves transmitted by a vehicle information and communication system (VICS) (registered trademark) such as a radio beacon, an optical beacon, and FM multiple broadcasting.

The map information storage unit 23 stores one or both of a map acquired from the outside and a map generated by the vehicle 1. For example, the map information storage unit 23 stores a three-dimensional high-precision map, a global map having a lower precision and covering a wider area than the high-precision map, and the like.

The high-precision map is for example a dynamic map, a point cloud map, a vector map, or the like. The dynamic map is for example a map including four layers, dynamic information, quasi-dynamic information, quasi-static information, and static information, and is provided to the vehicle 1 from the external server and the like.

The point cloud map is a map configured by a point cloud (point cloud data). Here, the vector map refers to a map adapted for an advanced driver assistance system (ADAS) in which traffic information or the like such as lane and signal positions are associated with the point cloud map.

The point cloud map and the vector map may be, for example, provided from the external server and the like. Otherwise, the point cloud map and the vector map may be generated at the vehicle 1 as a map for matching with local map to be described later on the basis of sensing results of a radar 52, a LiDAR 53, and the like and stored in the map information storage unit 23. Moreover, in a case where the high-precision map is provided from the external server and the like, for example, map data of hundreds of square meters relating to a planned path that the vehicle 1 will drive is acquired from the external server and the like in order to reduce the communication volume.

The vehicle position information acquisition unit 24 receives GNSS signals from a GNSS satellite and acquires position information of the vehicle 1. The received GNSS signals are supplied to the driving assistance and automated driving control unit 29. It should be noted that the vehicle position information acquisition unit 24 is not limited to the method using GNSS signals, and may acquire vehicle position information by using a beacon for example.

The external recognition sensor 25 includes various sensors used for recognizing an external situation of the vehicle 1 and supplies sensor data from the respective sensors to the respective units of the vehicle control system 11. The external recognition sensor 25 can include any type and any number of sensors.

For example, the external recognition sensor 25 includes a camera 51, a radar 52, a light detection and ranging, laser imaging detection and ranging (LiDAR) 53, and a millimeter-wave radar 54. The present technology is not limited thereto, and the external recognition sensor 25 may be configured to include one or more types of sensors of the camera 51, the radar 52, the LiDAR 53, and the millimeter-wave radar 54. The number of cameras 51, the number of radars 52, the number of LiDARs 53, and the number of millimeter-wave radars 54 are not particularly limited as long as they can be installed in the vehicle 1 in reality. Moreover, the types of sensors of the external recognition sensor 25 are not limited to this example, and the external recognition sensor 25 may include other types of sensors such as an ultrasonic sensor. An example of sensing regions of the respective sensors of the external recognition sensor 25 will be described later.

It should be noted that an imaging method for the camera 51 is not particularly limited as long as it can measure a distance. For example, as the camera 51, cameras using various imaging methods such as a time of flight (ToF) camera, a stereo camera, a monocular camera, and an infrared camera can be applied depending on needs. The present technology is not limited thereto, and the camera 51 may be simply for acquiring a captured image without being associated with distance measurement.

Moreover, for example, the external recognition sensor 25 can include an environment sensor for detecting an environment with respect to the vehicle 1. The environment sensor is a sensor for detecting an environment such as a climate, a weather, and brightness, and for example, can include various sensors such as a rain drop sensor, a fog sensor, a sunshine sensor, a snow sensor, and an illuminance sensor.

In addition, for example, the external recognition sensor 25 includes a microphone used for detecting positions of sounds and sound sources around the vehicle 1 for example.

The in-vehicle sensor 26 includes various sensors for detecting in-vehicle information, and supplies sensor data from the respective sensors to the respective units of the vehicle control system 11. The type and number of the various sensors of the in-vehicle sensor 26 are not particularly limited as long as they can be installed in the vehicle 1 in reality.

For example, the in-vehicle sensor 26 can include one or more sensors such as a camera, a radar, a seat sensor, a steering wheel sensor, a microphone, and a biometric sensor. For example, cameras using various imaging methods such as a ToF camera, a stereo camera, a monocular camera, and an infrared camera can be used as the camera of the in-vehicle sensor 26. The present technology is not limited thereto, and the camera of the in-vehicle sensor 26 may be simply for acquiring a captured image without being associated with distance measurement. The biometric sensor of the in-vehicle sensor 26 is for example provided in a seat, a steering wheel, or the like, and detects various types of biometric information of a passenger such as a driver.

The vehicle sensor 27 includes various sensors for detecting a state of the vehicle 1, and supplies sensor data from the respective sensors to the respective units of the vehicle control system 11. The type and number of various sensors of the vehicle sensor 27 are not particularly limited as long as they can be installed in the vehicle 1 in reality.

For example, the vehicle sensor 27 includes a speed sensor, an acceleration sensor, an angular velocity sensor (gyro sensor), and an inertial measurement unit (IMU) integrating them. For example, the vehicle sensor 27 includes a steering angle sensor that detects a steering angle of a steering wheel, a yaw rate sensor, an accelerator sensor that detects an amount of operation of an accelerator pedal, and a brake sensor that detects an amount of operation of a brake pedal. For example, the vehicle sensor 27 includes a rotation sensor that detects r.p.m. of an engine and a motor, an air pressure sensor that detects air pressure of wheels, a slip rate sensor that detects a slip rate of the wheels, and a wheel speed sensor that detects a rotation speed of the wheels. For example, the vehicle sensor 27 includes a battery sensor that detects a remaining battery and a temperature and an impact sensor that detects an impact from the outside.

The recording unit 28 includes at least one of a nonvolatile storage medium and a volatile storage medium and stores data and programs. The recording unit 28 is used as, for example, an electrically erasable programmable read only memory (EEPROM) and a random access memory (RAM). A magnetic storage device such as a hard disc drive (HDD), a semiconductor storage device, an optical storage device, and a magneto-optical storage device can be applied as the storage medium. The recording unit 28 records various types of programs and data used by the respective units of the vehicle control system 11. For example, the recording unit 28 includes an event data recorder (EDR) and data storage system for automated driving (DSSAD), and records information about the vehicle 1 before and after an event such as an accident and biometric information acquired by the in-vehicle sensor 26.

The driving assistance and automated driving control unit 29 controls driving assistance and automated driving of the vehicle 1. For example, the driving assistance and automated driving control unit 29 includes an analysis unit 61, an action planning unit 62, and an operation control unit 63.

The analysis unit 61 performs analysis processing of the vehicle 1 and a surrounding situation. The analysis unit 61 includes a self-position estimation unit 71, a sensor fusion unit 72, and the recognition unit 73.

The self-position estimation unit 71 estimates a self-position of the vehicle 1 on the basis of sensor data from the external recognition sensor 25 and a high-precision map stored in the map information storage unit 23. For example, the self-position estimation unit 71 generates a local map on the basis of sensor data from the external recognition sensor 25, performs matching between the local map and the high-precision map, and estimates a self-position of the vehicle 1. The position of the vehicle 1 is based on a center on a vehicle axis of a pair of rear wheels for example.

The local map is for example a three-dimensional high-precision map, an occupancy grid map, or the like generated using a technology such as simultaneous localization and mapping (SLAM). The three-dimensional high-precision map is for example the above-mentioned point cloud map or the like. The occupancy grid map is a map showing an occupancy state of an object on a grid-by-grid basis where a three-dimensional or two-dimensional space around the vehicle 1 is divided into predetermined-size grids. The occupancy state of the object is indicated by, for example, the presence/absence of an object or a presence probability. The local map is also used for, for example, detection processing and recognition processing of an external situation of the vehicle 1 by the recognition unit 73.

It should be noted that the self-position estimation unit 71 may estimate a self-position of the vehicle 1 on the basis of a GNSS signal and sensor data from the vehicle sensor 27.

The sensor fusion unit 72 performs sensor fusion processing to obtain new information, combining a plurality of different types of sensor data (e.g., image data supplied from the camera 51 and sensor data supplied from the radar 52). Methods of combining different types of sensor data include integration, fusion, unification, and the like.

The recognition unit 73 executes detection processing of detecting an external situation of the vehicle 1 and recognition processing of recognizing an external situation of the vehicle 1.

For example, the recognition unit 73 performs detection processing and recognition processing for the external situation of the vehicle 1 on the basis of information from the external recognition sensor 25, information from the self-position estimation unit 71, information from the sensor fusion unit 72, and the like.

Specifically, for example, the recognition unit 73 performs, for example, detection processing and recognition processing for an object around the vehicle 1. The detection processing for the object is for example processing of detecting presence/absence, size, shape, position, motion, and the like of the object. The recognition processing for the object is for example processing of recognizing an attribute such as the type of object or identifying a particular object. It should be noted that the detection processing and the recognition processing are not necessarily clearly separated and may overlap.

For example, the recognition unit 73 detects an object around the vehicle 1 by clustering to classify point clouds based on the sensor data of the LiDAR 53, the radar 52, or the like for each point cloud. Accordingly, presence/absence, size, shape, and position of the object around the vehicle 1 are detected.

For example, the recognition unit 73 detects a movement of an object around the vehicle 1 by tracking to follow a movement of each of point clouds classified by clustering. Accordingly, speed and travelling direction (movement vector) of the object around the vehicle 1 are detected.

For example, the recognition unit 73 detects or recognizes vehicles, humans, bicycles, obstacles, structures, roads, traffic lights, traffic signs, road signs, or the like with respect to the image data supplied from the camera 51. Moreover, the type of object around the vehicle 1 may be recognized by recognition processing such as semantic segmentation.

For example, the recognition unit 73 is capable of performing recognition processing for traffic control around the vehicle 1 on the basis of a map stored in the map information storage unit 23, an estimation result of a self-position by the self-position estimation unit 71, and a recognition result of an object around the vehicle 1 by the recognition unit 73. By this processing, the recognition unit 73 is capable of recognizing position and state of a signal, content of traffic signs and road signs, content of the traffic control, and lanes on which driving is allowed, and the like.

For example, the recognition unit 73 is capable of performing recognition processing of a surrounding environment of the vehicle 1. A climate, a temperature, humidity, brightness, a road surface state, and the like are assumed as a surrounding environment to be recognized by the recognition unit 73.

The action planning unit 62 generates an action plan of the vehicle 1. For example, the action planning unit 62 performs path planning and path following processing, to thereby generate an action plan.

It should be noted that the path planning (global path planning) is processing of planning a rough path from a start to a goal. This path planning also includes trajectory generation (local path planning) processing, which is called trajectory planning and enables safe and smooth travelling near the vehicle 1 on a path planned by path planning in consideration of movement characteristics of the vehicle 1. The path planning may be distinguished as long-period path planning and the trajectory generation may be distinguished as short-period path planning or local path planning. A safety-prioritized path represents a concept similar to the trajectory generation, the short-period path planning, or the local path planning.

The path following is processing of planning an operation for safely and correctly driving a path planned by the path planning in a planned time. The action planning unit 62 is capable of calculating a target speed and a target angular velocity of the vehicle 1 on the basis of a processing result of this path following for example.

The operation control unit 63 controls the operation of the vehicle 1 in order to realize an action plan generated by the action planning unit 62.

For example, the operation control unit 63 controls a steering control unit 81, a braking control unit 82, and a driving control unit 83, which are included in the vehicle control unit 32 to be described later, and performs acceleration/deceleration control and direction control so that the vehicle 1 travels a trajectory calculated by trajectory planning. For example, the operation control unit 63 performs cooperative control for realizing ADAS functions such as collision avoidance or impact mitigation, cruise control, constant speed driving, collision warning of the self-vehicle, and lane departure warning of the self-vehicle. For example, the operation control unit 63 performs cooperative control for automated driving or the like to perform driving autonomously irrespective of driver operations.

The DMS 30 performs driver authentication processing, driver condition recognition processing, and the like on the basis of sensor data from the in-vehicle sensor 26, input data input to the HMI 31 to be described later, and the like. In this case, for example, health conditions, wakefulness, a concentration level, a level of fatigue, a gazing direction, an alcohol level, a driving operation, a posture, etc. are assumed as driver conditions to be recognized by the DMS 30.

It should be noted that the DMS 30 may perform authentication processing of a passenger other than the driver and recognition processing of conditions of the passenger. Moreover, for example, the DMS 30 may perform recognition processing of in-vehicle conditions on the basis of sensor data from the in-vehicle sensor 26. For example, temperature, humidity, brightness, smell, and the like are assumed as the in-vehicle conditions to be recognized.

The HMI 31 inputs various types of data, instructions, and the like and presents various types of data to the driver or the like.

Data input by the HMI 31 will be schematically described. The HMI 31 includes an input device for humans to input data. On the basis of data, instruction, and the like input by the input device, the HMI 31 generates an input signal and supplies the input signal to the respective units of the vehicle control system 11. The HMI 31 includes operation elements such as a touch panel, buttons, switches, and a lever, for example, as the input device. The present technology is not limited thereto, and the HMI 31 may further include an input device capable of inputting information by a method other than manual operations, e.g., sounds, gestures, and the like. In addition, the HMI 31 may use an external connection device such as a remote control device using infrared rays or radio waves, for example, and a mobile device or wearable device adapted for the operation of the vehicle control system 11 as the input device.

Data presentation by the HMI 31 will be schematically described. The HMI 31 generates visual information, auditory information, and tactile information relating to the passenger or the outside of the vehicle. Moreover, the HMI 31 performs output control to control the output of each of these types of information generated, output contents, an output timing, an output method, and the like. The HMI 31 generates and outputs, as visual information, information shown as an image or light, for example, an operation screen, a status display of the vehicle 1, a warning display, and a monitor image showing a surrounding situation of the vehicle 1. Moreover, the HMI 31 generates and outputs, as auditory information, information shown as a sound, for example, audio guidance, a warning sound, and a warning message. In addition, the HMI 31 generates and outputs, as tactile information, information given to a sense of touch of the passenger, for example, a force, a vibration, and a motion.

For example, a display device that presents visual information by displaying an image by itself or a projector device that presents visual information by projecting an image can be applied as an output device by which the HMI 31 outputs visual information. It should be noted that the display device may be a device that displays visual information in a field of view of the passenger, such as a head-up display, a see-through display, and a wearable device with an augmented reality (AR) function other than a display device with a normal display. Moreover, the HMI 31 may use, as the output device that outputs visual information, a display device with a navigation device, an instrument panel, a camera monitoring system (CMS), an electronic mirror, a lamp, or the like provided in the vehicle 1.

For example, an audio speaker, headphones, or earphones can be applied as the output device by which the HMI 31 outputs auditory information.

For example, haptics elements using haptics technology can be applied as the output device by which the HMI 31 outputs tactile information. The haptics elements are provided in portions that the passenger of the vehicle 1 touches, such as the steering wheel and the seat for example.

The vehicle control unit 32 controls the respective units of the vehicle 1. The vehicle control unit 32 includes the steering control unit 81, the braking control unit 82, the driving control unit 83, a body system control unit 84, a light control unit 85, and a horn control unit 86.

The steering control unit 81, for example, detects and controls a state of a steering system of the vehicle 1. The steering system includes a steering mechanism, an electric power steering, or the like including, for example, the steering wheel and the like. The steering control unit 81 includes a control unit or the like that controls, for example, the steering system, such as an ECU, an actuator that drives the steering system, and the like.

The braking control unit 82, for example, detects and controls a state of a braking system of the vehicle 1. The braking system includes, for example, a braking mechanism, an antilock braking system (ABS), a regenerative braking mechanism, or the like including the brake pedal and the like. The braking control unit 82 includes a control unit or the like that controls, for example, the braking system, such as an ECU.

The driving control unit 83, for example, detects and controls a state of the driving system of the vehicle 1. The driving system includes, for example, an accelerator pedal, a driving force generation device for generating driving force for an internal-combustion engine, a driving motor, or the like, a driving force transmission mechanism for transmitting driving force to wheels, and the like. The driving control unit 83 includes a control unit or the like that controls, for example, the braking system, such as an ECU.

The body system control unit 84, for example, detects and controls a state of a body system of the vehicle 1. The body system includes, for example, a keyless entry system, a smart key system, a power window apparatus, a power seat, an air conditioning device, an air bag, a seat belt, a gear shift, and the like. The body system control unit 84 includes a control unit or the like that controls, for example, the body system, such as an ECU.

The light control unit 85, for example, detects and controls states of various lights of the vehicle 1. For example, a head light, a back light, fog lights, turn signals, brake lights, a projection, a bumper display, and the like are assumed as lights to be controlled. The light control unit 85 includes a control unit or the like that controls the lights, such as an ECU.

The horn control unit 86, for example, detects and controls states of a car horn of the vehicle 1. The horn control unit 86 includes a control unit that controls, for example, the car horn, such as an ECU.

Figure 2:
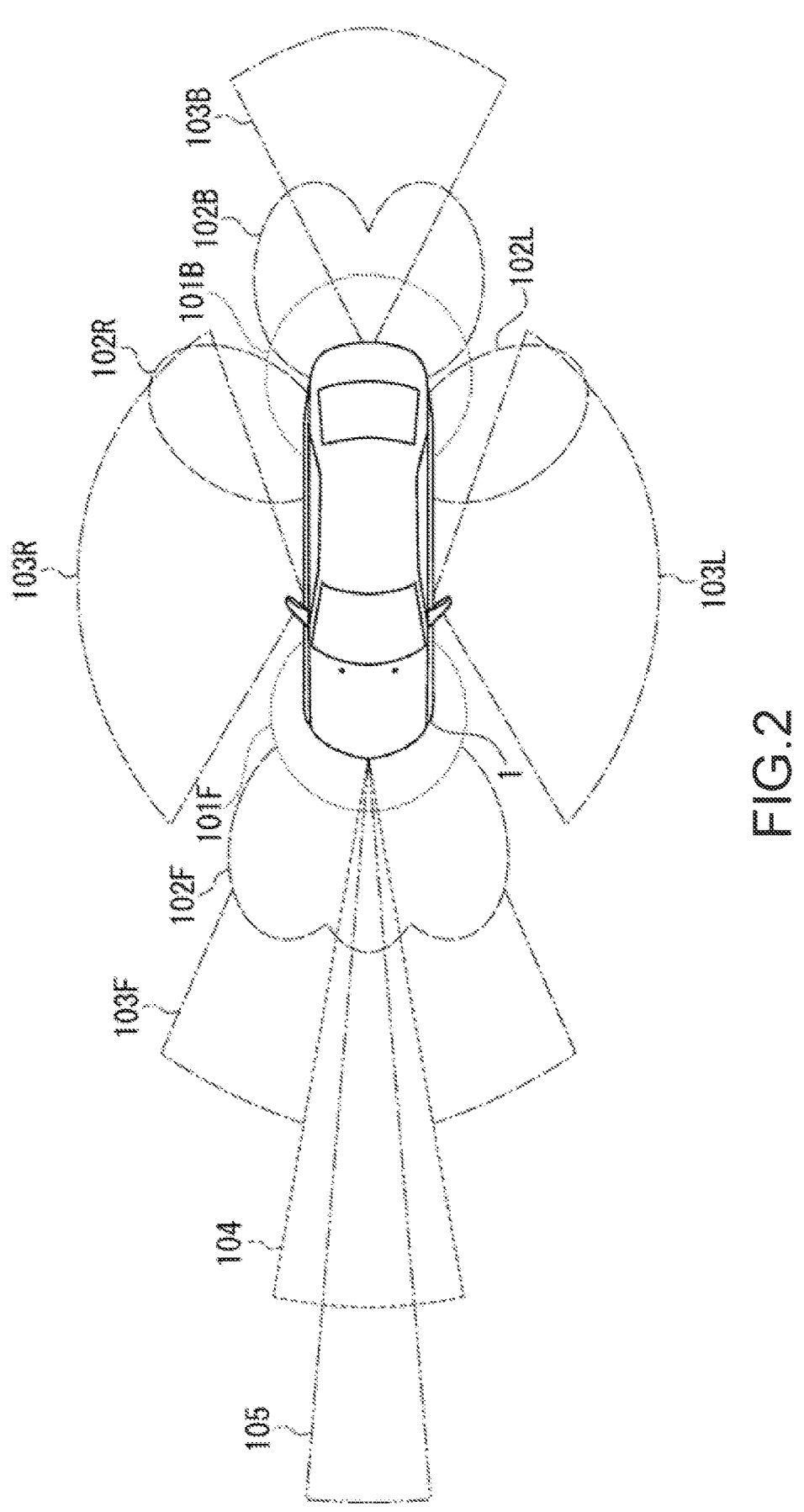
FIG. 2 A diagram showing exemplary sensing regions by a camera, a radar, a LiDAR, and a millimeter-wave radar, and the like of an external recognition sensor of FIG. 1.

FIG. 2 is a diagram showing exemplary sensing regions the camera 51, the radar 52, the LiDAR 53, and the millimeter-wave radar 54, and the like of the external recognition sensor 25 of FIG. 1.

It should be noted that in FIG. 2, a state of the vehicle 1 as viewed from the upper surface is schematically shown, the left end side is a front end (front) side of the vehicle 1, and the right end side is a rear end (rear) side of the vehicle 1.

A sensing region 101F and a sensing region 101B show exemplary sensing regions of the millimeter-wave radar 54. The sensing region 101F covers a periphery of the front end of the vehicle 1 with a plurality of millimeter-wave radars 54. The sensing region 101B covers a periphery of the rear end of the vehicle 1 with the plurality of millimeter-wave radars 54.

Sensing results of the sensing region 101F and the sensing region 101B are used for parking assistance of the vehicle 1 for example.

A sensing region 102F to a sensing region 102B show an example of a sensing region of the radar 52 for a short or middle distance. The sensing region 102F covers a further area in front of the vehicle 1 than the sensing region 101F. The sensing region 102B covers a further area in rear of the vehicle 1 than the sensing region 101B. A sensing region 102L covers a periphery of the rear of a left side surface of the vehicle 1. A sensing region 102R covers a periphery of the rear of a right side surface of the vehicle 1.

Sensing results of the sensing region 102F are used for detecting vehicles, pedestrians, and the like located in front of the vehicle 1 for example. Sensing results of the sensing region 102B are used for a function of preventing a collision in rear of the vehicle 1 for example. Sensing results of the sensing region 102L and the sensing region 102R are used for detecting an object at a blind spot on a lateral side of the vehicle 1 for example.

A sensing region 103F to a sensing region 103B show exemplary sensing regions by the camera 51. The sensing region 103F covers a further area in front of the vehicle 1 than the sensing region 102F. The sensing region 103B covers a further area in rear of the vehicle 1 than the sensing region 101B. A sensing region 103L covers a periphery of a left side surface of the vehicle 1. A sensing region 103R covers a periphery of a right side surface of the vehicle 1.

Sensing results of the sensing region 103F can be used for, for example, traffic light and traffic sign recognition, a lane departure preventing assistance system, or an automatic head light control system. Sensing results of the sensing region 103B can be used for parking assistance and a surrounding view system for example. Sensing results of the sensing region 103L and the sensing region 103R can be used for the surrounding view system for example.

A sensing region 104 shows an exemplary sensing region of the LiDAR 53. The sensing region 104 covers a further area in front of the vehicle 1 than the sensing region 103F. On the other hand, the sensing region 104 has a narrower area in the left and right directions than the sensing region 103F.

Sensing results of the sensing region 104 are used for detecting objects such as surrounding vehicles for example.

A sensing region 105 shows exemplary sensing regions of the radar 52 for a long distance.

The sensing region 105 covers a further area in front of the vehicle 1 than the sensing region 104. On the other hand, the sensing region 105 has a narrower area in the left and right directions than the sensing region 104.

Sensing results of the sensing region 105 are used for adaptive cruise control (ACC), emergency brake, collision avoidance, and the like for example.

It should be noted that sensing regions of the respective sensors of the camera 51, the radar 52, the LiDAR 53, and the millimeter-wave radar 54 of the external recognition sensor 25 may take various configurations other than those of FIG. 2. Specifically, the millimeter-wave radar 54 may sense the lateral sides of the vehicle 1 or the LiDAR 53 may sense the rear of the vehicle 1. Moreover, the mounting position of each sensor is not limited to each of the above-mentioned examples. Moreover, a single sensor or a plurality of sensors may be provided for each type of sensors.

[Configuration Example of Calibration System]

Figures 3A, 3B:
FIGS. 3A and 3B The schematic diagrams for describing the overview of the calibration system.

FIGS. 3A and 3B are schematic diagrams for describing the overview of a calibration system 110.

As shown in FIG. 3A, the calibration system 110 has the vehicle 1 and an information processing apparatus 120. The vehicle 1 and the information processing apparatus 120 are connected to be capable of communicating with each other with a wire or wirelessly. The connection form between the devices is not limited, and for example, wireless LAN communication such as Wi-Fi or near-field communication such as Bluetooth (registered trademark) can be used.

In the present embodiment, the millimeter-wave radar 54 of the external recognition sensor 25 is used as a distance measurement sensor mounted on the vehicle 1.

The millimeter-wave radar 54 is capable of emitting radio waves at an extremely high frequency (EHF) to a target and measuring a distance to the target on the basis of a time it takes to receive radio waves reflected and returning from the target. In the present embodiment, two millimeter-wave radars 54 are mounted on the front end (front) side of the vehicle 1 and measure a distance to a target 115 that is a calibration reference. Hereinafter, one of the millimeter-wave radars 54 mounted on the vehicle 1 will be referred to as a millimeter-wave radar 54R and the other will be referred to as a millimeter-wave radar 54L.

It should be noted that in the present embodiment, parameters to be calibrated are parameters of six axes combining relative positions of the external recognition sensor 25 in three axis directions (XYZ directions) orthogonal to one another with relative angles of the three axes such as pitch, yaw, and roll. Moreover, in the present embodiment, the millimeter-wave radar 54L is set as a calibration target.

Moreover, in the present embodiment, the target 115 is in a still state, i.e., a state in which its position information is unknown. The still state is a state in which the position (coordinates) does not change during the calibration.

The position information is information about a relative position between the target 115 and a reference point for calibration. For example, the target 115 and the reference point for calibration are fixed with a jig or a distance measurement apparatus other than the above-mentioned distance measurement sensor measures relative position information. The reference point for calibration is for example a position of a radar of a plurality of radars, which is a reference.

It should be noted that the shape of the target 115 is not limited, and any shape may be used as long as the sensor can acquire distance measurement data.

FIG. 3B is a schematic diagram showing a configuration of the millimeter-wave radar 54.

As shown in FIG. 3B, the millimeter-wave radar 54R includes a transmission antenna Tx1 and four reception antennas Rx11, Rx12, Rx13, and Rx14. Moreover, the millimeter-wave radar 54L includes a transmission antenna Tx2 and four reception antennas Rx21, Rx22, Rx23, and Rx24.

In the present embodiment, the transmission antenna and the four reception antennas are arranged in a straight line.

For example, millimeter waves sent from the transmission antenna Tx1 are reflected on the target 115 and received by the four reception antennas Rx11, Rx12, Rx13, and Rx14. In this manner, sensing results are measured. In the present embodiment, the sensing results measured by the millimeter-wave radar 54 are supplied to the information processing apparatus 120.

The information processing apparatus 120 generates a calibration parameter on the basis of a phase difference vector between a reference reception antenna that is a reference and each of other reception antennas other than the reference reception antenna and a reference phase difference vector that is a reference.

In the present embodiment, the reception antenna Rx11 of the reception antennas Rx11, Rx12, Rx13, and Rx14 is set as the reference reception antenna. Thus, the reception antennas Rx11, Rx12, Rx13, and Rx14 correspond to one or more other reception antennas.

The phase difference vector is a vector indicating a difference of a phase of a reflection wave reflected on the target 115 that each reception antenna receives. That is, the phase difference vector is a vector indicating a change in phase difference between a reflection wave that the reception antenna Rx11 that is the reference reception antenna receives and a reflection wave that each of the reception antennas Rx12, Rx13, and Rx14 receives.

The reference phase difference vector is a vector indicating a change in phase difference of a reflection wave that each reception antenna receives in an ideal state. The ideal state includes a state in which no external disturbance such as rains and winds is caused around the vehicle 1 and a state in which the position of the millimeter-wave radar 54 is not deviated due to a malfunction or the like.

Figure 4:
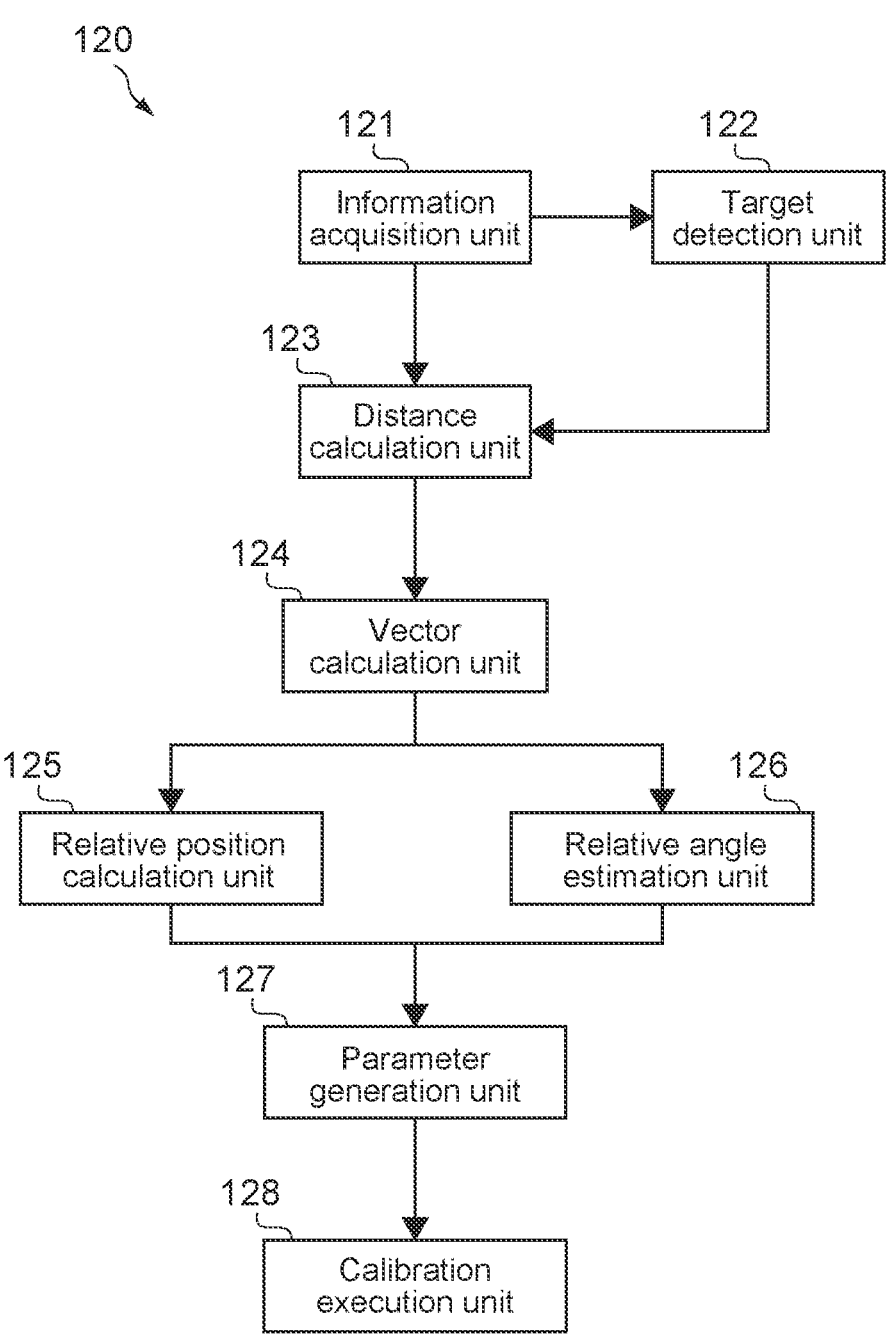
FIG. 4 A schematic diagram showing functional configuration examples of an information processing apparatus.

FIG. 4 is a schematic diagram showing functional configuration examples of the information processing apparatus 120.

Figure 7:
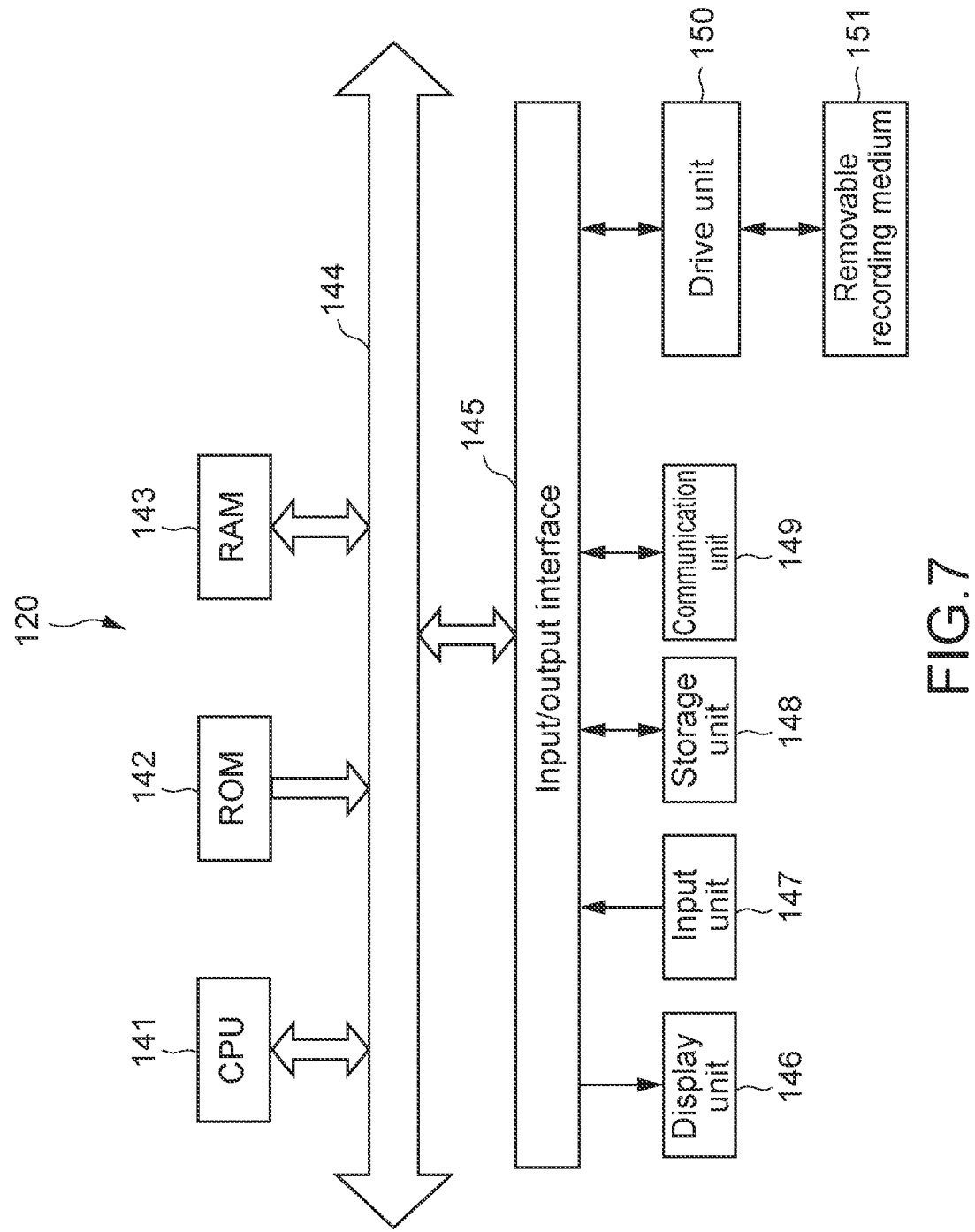
FIG. 7 A block diagram showing hardware configuration examples of the information processing apparatus.

The information processing apparatus 120 has hardware required for a computer configuration, the hardware for example including a processor such as a CPU, a GPU, and a DSP, a memory such as a ROM and a RAM, and a storage device such as an HDD (see FIG. 7). For example, the CPU loads a program according to the present technology, which is prestored in the ROM or the like, to the RAM and executes the program. In this manner, an information processing method according to the present technology is executed.

For example, any computer such as a PC can realize the information processing apparatus 120. As a matter of course, hardware such as a field-programmable gate array (FPGA) and an application specific integrated circuit (ASIC) may be used.

In the present embodiment, a parameter generation unit as a functional block is configured by the CPU executing a predetermined program. As a matter of course, dedicated hardware such as an integrated circuit (IC) may be used for realizing the functional block.

The program is installed in the information processing apparatus 120 via various recording media for example. Alternatively, the program may be installed via the Internet or the like.

The type and the like of recording medium on which the program is recorded is not limited, and any computer-readable recording medium may be used. For example, a computer-readable non-transitory arbitrary storage medium may be used.

As shown in FIG. 4, the information processing apparatus 120 has an information acquisition unit 121, a target detection unit 122, a distance calculation unit 123, a vector calculation unit 124, a relative position calculation unit 125, a relative angle estimation unit 126, a parameter generation unit 127, and a calibration execution unit 128.

The information acquisition unit 121 acquires various types of information. In the present embodiment, the information acquisition unit 121 acquires surrounding information of the vehicle 1 measured by the external recognition sensor 25 as a sensing result.

Moreover, in the present embodiment, the information acquired by the information acquisition unit 121 is supplied to the target detection unit 122 and the distance calculation unit 123.

The target detection unit 122 detects the target 115 that is a calibration reference. In the present embodiment, the target detection unit 122 detects an object suitable for the calibration reference from surrounding objects measured by the external recognition sensor 25, as a target. For example, a triangle mark with vertices whose relative distance is known in advance is detected as the target.

Moreover, in the present embodiment, information about the target detected by the target detection unit 124 is supplied to the distance calculation unit 123.

The distance calculation unit 123 calculates a distance between the target and each millimeter-wave radar 54. In the present embodiment, the distance calculation unit 123 calculates a distance to the target 115 on the basis of the target 115 detected by the target detection unit 122 and the sensing result acquired by the information acquisition unit 121. For example, the distance calculation unit 123 calculates a distance to the target 115 on the basis of a time it takes for the reception antenna to receive a millimeter wave sent from the transmission antenna.

Moreover, in the present embodiment, the information calculated by the distance calculation unit 123 is supplied to the vector calculation unit 124.

The vector calculation unit 124 calculates a phase difference vector. In the present embodiment, the vector calculation unit 124 calculates a phase difference vector between the reference reception antenna and each reception antenna.

Moreover, the vector calculation unit 124 calculates a reference phase difference vector between the reference reception antenna in the ideal state and each reception antenna. It should be noted that the reference phase difference vector may be prepared in advance depending on the positional relationship, the type, and the performance of the millimeter-wave radar 54 mounted on the vehicle 1. A reference phase difference vector corresponding to the millimeter-wave radar 54 mounted on the vehicle 1 may be acquired for example on the basis of the phase difference acquired by the information acquisition unit 121.

Moreover, the vector calculation unit 124 projects the calculated phase difference vector onto the reference phase difference vector.

The relative position calculation unit 125 calculates a relative position between the target 115 and each reception antenna of the millimeter-wave radar 54. In the present embodiment, the relative position calculation unit 125 calculates a relative position between the reception antenna and the target 115 on the basis of a calculation result calculated by the vector calculation unit 124.

Moreover, the relative position calculation unit 125 converts the calculated positional relationship between the respective reception antennas on a coordinate axis of the millimeter-wave radar 54. It should be noted that the positional relationship includes a relative position and a relative angle of each reception antenna.

Moreover, in the present embodiment, the relative position between the target 115 and each reception antenna, which has been calculated by the relative position calculation unit 125, is supplied to the parameter generation unit 127.

The relative angle estimation unit 126 estimates a coming direction of the millimeter wave sent from the transmission antenna, which has been reflected on the target 115 and received by the reception antenna. In the present embodiment, the relative angle estimation unit 126 estimates a relative angle between the reception antenna and the target 115 on the basis of the calculation result calculated by the vector calculation unit 124.

Moreover, in the present embodiment, the relative angle between the target 115 and each reception antenna, which has been estimated by the relative angle estimation unit 126, is supplied to the parameter generation unit 127.

The parameter generation unit 127 generates a calibration parameter required for calibration of the millimeter-wave radar 54 that is the distance measurement sensor. In the present embodiment, the parameter generation unit 127 generates a calibration parameter on the basis of the phase difference vector between the reference reception antenna and each of other reception antennas other than the reference reception antenna, which is calculated on the basis of the sensing result measured by the millimeter-wave radar 54, and the reference phase difference vector.

The calibration execution unit 128 executes calibration on the basis of the calibration parameter. In the present embodiment, the calibration execution unit 128 calibrates millimeter-wave radars 54R and 54L on the basis of the calibration parameter generated by the parameter generation unit 127.

It should be noted that in the present embodiment, the parameter generation unit 127 corresponds to a generation unit that generates a calibration parameter on the basis of a phase difference vector and a reference phase difference vector that is a reference, the phase difference vector being calculated on the basis of a sensing result, the sensing result being measured by a distance measurement sensor, the distance measurement sensor including a plurality of reception antennas and one or more transmission antennas, the plurality of reception antennas including a reference reception antenna and one or more other reception antennas, the phase difference vector being a phase difference vector between the reference reception antenna and each of the one or more other reception antennas.

It should be noted that in the present embodiment, the relative angle estimation unit 126 corresponds to an estimation unit that estimates a coming direction of a sending wave, the sending wave being sent from the transmission antenna, reflected on the target, and received by at least one of the plurality of reception antennas.

It should be noted that in the present embodiment, the relative position calculation unit 125 corresponds to a calculation unit that calculates a relative position between the target and each of the plurality of reception antennas.

It should be noted that in the present embodiment, the calibration execution unit 128 corresponds to an execution unit that executes calibration on the basis of the calibration parameter.

It should be noted that in the present embodiment, the vehicle 1 corresponds to a mobile apparatus on which the distance measurement sensor is mounted.

Figure 5:
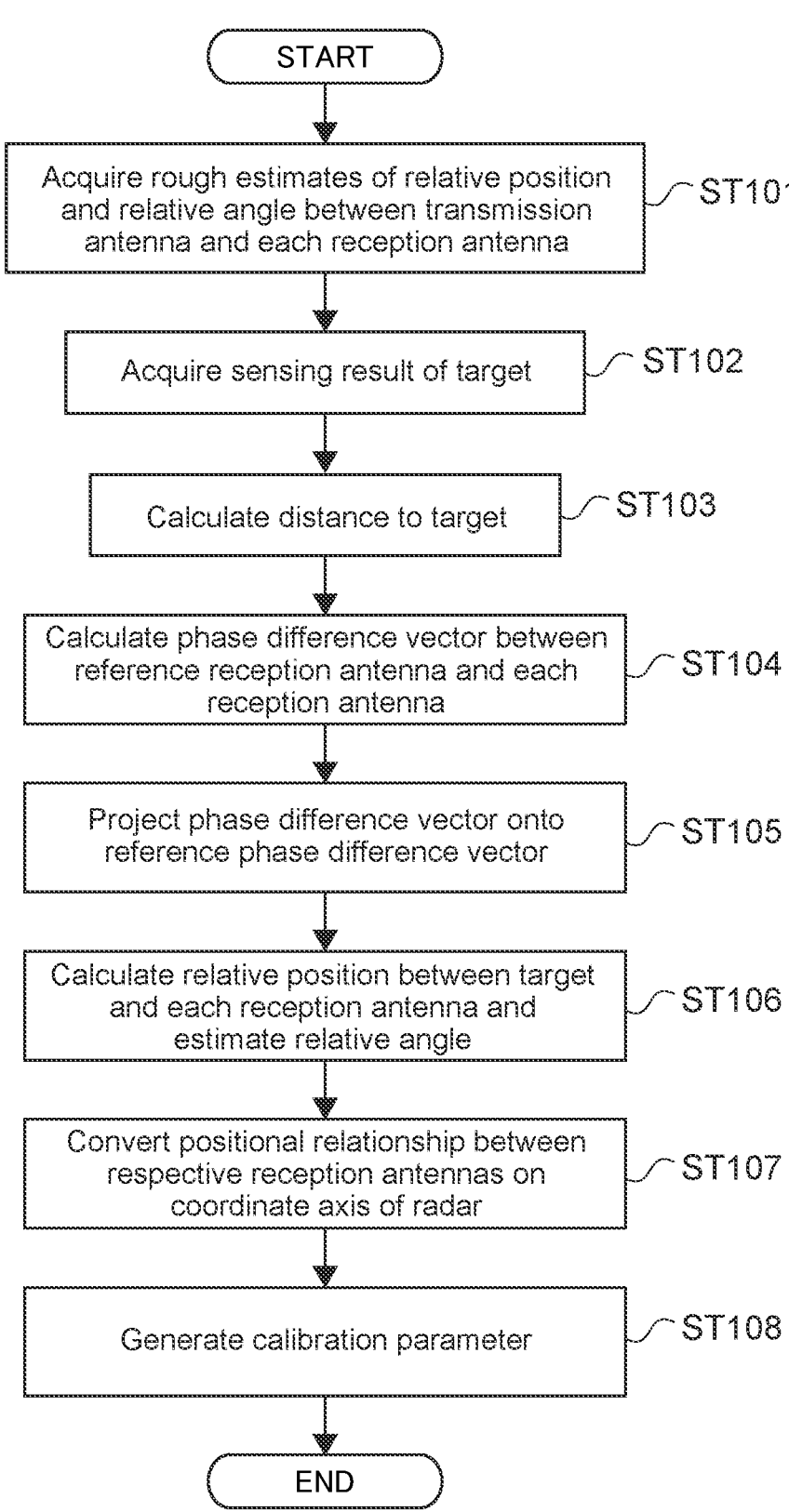
FIG. 5 A flowchart showing a generation example of calibration parameter.

FIG. 5 is a flowchart showing an example of generation of a calibration parameter.

The information acquisition unit 121 acquires rough estimates of a relative position and a relative angle between the transmission antenna and each reception antenna (Step 101). For example, the information acquisition unit 121 acquires a relative position and a relative angle between the transmission antenna and each reception antenna when the vehicle 1 is designed or manufactured.

Moreover, the information acquisition unit 121 acquires a sensing result of the target 115 measured by the millimeter-wave radar 54 (Step 102).

The distance calculation unit 123 calculates a distance to the target 115 on the basis of the sensing result (Step 103).

The vector calculation unit 124 calculates a phase difference vector between the reference reception antenna and each reception antenna (Step 104). It should be noted that the phase difference vector may not be determined uniquely depending on a relative angle between the target 115 and the millimeter-wave radar 54. In that case, the vector calculation unit 124 uniquely determines a phase difference vector by using rough estimates of relative positions between transmission antenna and the respective reception antennas, which has been acquired at Step 101, as a condition of the relative angle with respect to the target 115. For example, in a case where the phase difference is 10 degrees and 370 degrees, the phase difference vector of 370 degrees is excluded from the rough estimates of relative positions between the transmission antenna and the respective reception antennas and the phase difference vector of 10 degrees is calculated.

Moreover, the vector calculation unit 124 projects the phase difference vector onto the reference phase difference vector (Step 105).

The relative position calculation unit 125 calculates a relative position between the target 115 and each reception antenna and the relative angle estimation unit 126 estimates a relative angle (Step 106).

The relative position calculation unit 125 converts the calculated positional relationship between the respective reception antennas on the coordinate axis of the millimeter-wave radar 54 (Step 107).

The parameter generation unit 127 generates a calibration parameter on the basis of the calculated relative position and relative angle of each reception antenna (Step 108). The calibration execution unit 128 calibrates the millimeter-wave radar 54 on the basis of the generated calibration parameter.

The above-mentioned steps finish calibration of the millimeter-wave radar 54L. Also, steps 101 to 108 finish calibration of the millimeter-wave radar 54R.

For example, in a case of providing three or more millimeter-wave radars 54, Steps 101 to 108 are performed until finishing calibration of the respective millimeter-wave radars 54. Moreover, in this case, arithmetic processing such as arithmetic mean may be performed on the respective generated calibration parameters.

Calibration Example

Figure 6:
FIG. 6 A schematic diagram showing a calibration example.
Figure 6:
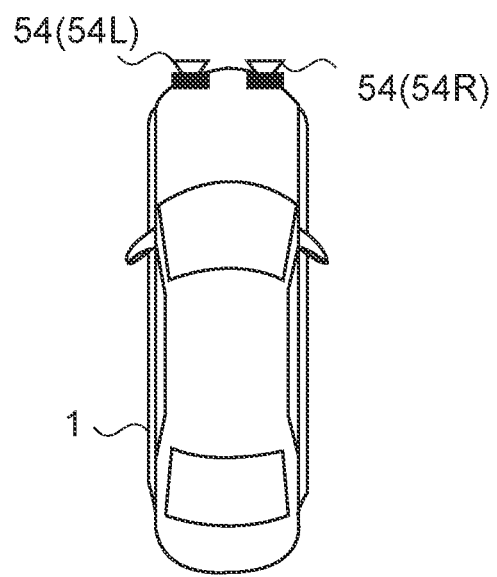

FIG. 6 is a schematic diagram showing a calibration example.

In FIG. 6, the position of a road cone that is a target is changed four times and calibration is executed every time the position of the road cone is changed. That is, assuming that the millimeter-wave radar 54 first calibrates a road cone 131 placed at a left end (solid line), the millimeter-wave radar 54 secondly calibrates a road cone 132 placed at an adjacent dotted-line position. Also, a road cone 133 (and a road cone 134) is placed at an adjacent dotted-line position. Calibration is executed a total of four times.

In the present embodiment, the transmission antenna and the reception antenna constituting the millimeter-wave radars 54R and 54L have a sufficient distance with respect to a detected wavelength so as to mutually generate a phase difference.

Moreover, in the present embodiment, it is assumed that calibration is executed during the shipment from a factory or during the repair. That is, calibration is executed when the vehicle 1 is not traveling, i.e., when the vehicle 1 is in a still state.

The millimeter-wave radar 54 emits a millimeter wave to the road cone 131 and receives a reflection wave reflected on the road cone 131.

The vector calculation unit 124 calculates a phase difference vector between the reference reception antenna and each reception antenna on the basis of the received sensing result of the road cone 131.

Moreover, the vector calculation unit 124 calculates a reference phase difference vector. For example, a phase difference vector when the positional relationship between the respective reception antennas arranged in the vehicle 1 is as designed is calculated as the reference phase difference vector.

Moreover, the vector calculation unit 124 projects the calculated phase difference vector onto the reference phase difference vector.

The relative position calculation unit 125 calculates a relative position between the road cone 131 and each reception antenna and the relative angle estimation unit 126 estimates a relative angle.

Moreover, the relative position calculation unit 125 converts the calculated relative position and relative angle of each reception antenna on the coordinate axis of the millimeter-wave radar 54.

The parameter generation unit 127 generates a calibration parameter on the basis of the calculated relative position and relative angle of each reception antenna.

The calibration execution unit 128 calibrates the millimeter-wave radar 54 on the basis of the generated calibration parameter.

Such processing finishes the first calibration. Executing the second, third, and fourth calibration similarly can enhance the precision calibration. That is, it correctly acquires a sensing result of a target to be measured, which is located outside the vehicle 1 and measured by the external recognition sensor 25.

Hereinabove, the information processing apparatus 120 according to the present embodiment generates a calibration parameter on the basis of the phase difference vector between the reference reception antenna Rx11 and each of the reception antennas and the reference phase difference vector, the phase difference vector being calculated on the basis of the sensing result measured by the millimeter-wave radar 54 including the plurality of reception antennas and the one or more transmission antennas, the plurality of reception antennas including the reference reception antenna Rx11 and the reception antennas Rx11, Rx12, Rx13, and Rx14. Accordingly, the calibration accuracy can be enhanced.

Conventionally, in calibration, a point target whose position is known is necessary and a sufficient distance that does not cause aliasing due to phase difference characteristics is required between the radar and the target.

Moreover, a technology of combining information from a plurality of vehicle-mounted millimeter-wave radars in order to obtain precision higher than a single millimeter-wave radar is under consideration. However, if distance and direction between the sensors in sensor information to be combined are inaccurate, the accuracy of the combined information is low. An estimation result of an angle with respect to the point target is used as an approach to correct information about a mutual position between the sensors. However, the distance between the point target and the sensor is necessary. Moreover, the precision of the mutual position between the sensors depends on the angle estimation accuracy of each sensor.

In view of this, the present technology generates a calibration parameter on the basis of a phase difference vector between the reference reception antenna and each reception antenna, which is calculated on the basis of the sensing result measured by the distance measurement sensor, and the reference phase difference vector. Moreover, it is possible to set a plurality of target positions so as to generate a plurality of phase differences between the target and respective millimeter-wave radars and then uniquely determine a target position. Accordingly, even in a case where the radar and the target have a distance that causes aliasing due to phase difference characteristics, a target whose position information is unknown can be used as a calibration target and calibration can be performed between the millimeter-wave radars.

Other Embodiments

The present technology is not limited to the above-mentioned embodiments, and various other embodiments can be realized.

In the above-mentioned embodiments, the millimeter-wave radar 54 is the calibration target. The present technology is not limited thereto, and various sensors may be the calibration target. For example, an ultrasonic sensor capable of determining a coming direction of a reflection wave through a plurality of sensors may be the calibration target.

In the above-mentioned embodiments, the information processing apparatus executes calibration. The present technology is not limited thereto, and the information processing apparatus may be mounted on the vehicle 1.

In the above-mentioned embodiments, the vehicle-mounted sensor is the calibration target. The present technology is not limited thereto, and it may be a sensor installed in a wall of a ceiling or the like or a sensor mounted on an autonomous movable robot or the like.

In the above-mentioned embodiments, the transmission antenna and the reception antennas constituting the millimeter-wave radar 54 are arranged in the straight line. The present technology is not limited thereto, and the transmission antenna and the reception antenna may be arbitrarily arranged. For example, the reception antennas may be arranged at uniform intervals around the transmission antenna that is the center on a plane.

In the above-mentioned embodiments, calibration is executed multiple times while changing the target position. The present technology is not limited thereto, and calibration may be executed one time with high calibration accuracy. For example, the information processing apparatus may include a determination unit that determines calibration accuracy and whether or not the calibration accuracy is above a threshold may be determined every time calibration is executed.

FIG. 7 is a block diagram showing hardware configuration examples of the information processing apparatus 120.

The information processing apparatus 20 includes a CPU 141, a ROM 142, a RAM 143, an input/output interface 145, and a bus 144 for connecting them to one another. A display unit 146, an input unit 147, a storage unit 148, a communication unit 149, a drive unit 150, and the like are connected to the input/output interface 145.

The display unit 146 is a display device using liquid crystals, electroluminescence (EL), or the like for example. The input unit 147 is for example a keyboard, a pointing device, a touch panel, or another operation device. In a case where the input unit 147 includes a touch panel, the touch panel can be integrated with the display unit 146.

The storage unit 148 is a nonvolatile storage device. The storage unit 148 is for example an HDD, a flash memory, or another solid-state memory. The drive unit 150 is for example a device capable of driving a removable recording medium 151 such as an optical recording medium and a magnetic recording tape.

The communication unit 149 is a modem, a router, or another communication device for communicating with other devices, which is connectable to a LAN, a WAN, and the like. The communication unit 149 may perform wired communication or may perform wireless communication. The communication unit 149 is often used separately from the information processing apparatus 20.

Cooperation of software stored in the storage unit 148, the ROM 142, or the like with hardware resources of the information processing apparatus 20 realizes information processing of the information processing apparatus 20 having the above-mentioned hardware configuration. Specifically, loading programs to configure the software, which have been stored in the ROM 142 or the like, to the RAM 143 and executing them realize the information processing method according to the present technology.

The programs are, for example, installed in the information processing apparatus 20 via the recording medium 151. Alternatively, the programs may be installed in the information processing apparatus 20 via a global network or the like. Otherwise, any computer-readable non-transitory storage medium may be used.

Cooperation of a computer mounted on a communication terminal with another computer capable of communicating therewith via a network or the like may execute the information processing apparatus, the information processing method, and the program according to the present technology and build the information processing apparatus according to the present technology.

That is, the information processing apparatus, the information processing method, and the program according to the present technology can be executed not only in a computer system configured by a single computer but also in a computer system where a plurality of computers operate in conjunction with each other. It should be noted that in the present disclosure, the system means a set of a plurality of components (devices, modules (parts), etc.) and it does not matter whether or not all the components are housed in the same casing. Therefore, a plurality of devices housed in separate casings and connected via a network and a device with a plurality of modules housed in a single casing are both systems.

Execution of the information processing apparatus, the information processing method, and the program according to the present technology by the computer system includes, for example, both a case where a single computer executes relative position calculation, phase difference vector calculation, calibration parameter generation, and the like and a case where different computers execute the respective processes. Moreover, execution of the respective processes by a predetermined computer includes causing other computers to execute some or all of the respective processes and acquiring the results.

That is, the information processing apparatus, the information processing method, and the program according to the present technology can also be applied to a cloud computing configuration in which a plurality of devices shares and commonly processes a single function via a network.

The respective configurations such as the vector calculation unit, the relative position calculation unit, and the parameter generation unit, the control flow of the communication system, and the like that have been described with reference to the drawings are merely embodiments and can be arbitrarily modified without departing from the gist of the present technology. Any other configurations, algorithms, and the like for carrying out the present technology may be thus employed.

It should be noted that the various effects described in the present disclosure are merely illustrative, not limitative, and other effects may be provided. The description of the plurality of effects above does not mean that these effects are always simultaneously provided. It means that at least any one of the above-mentioned effects is provided depending on a condition and the like. As a matter of course, effects not described in the present disclosure can be provided.

At least two of the features according to the above-mentioned embodiments may be combined. That is, the various features described in the respective embodiments may be arbitrarily combined across the respective embodiments.

It should be noted that the present technology can also take the following configurations.

(1) An information processing apparatus, including
a generation unit that generates a calibration parameter on the basis of a phase difference vector and a reference phase difference vector that is a reference, the phase difference vector being calculated on the basis of a sensing result, the sensing result being measured by a distance measurement sensor, the distance measurement sensor including a plurality of reception antennas and one or more transmission antennas, the plurality of reception antennas including a reference reception antenna and one or more other reception antennas, the phase difference vector being a phase difference vector between the reference reception antenna and each of the one or more other reception antennas.

(2) The information processing apparatus according to (1), in which
the sensing result includes measurement data that is a target to be used for calibration.

(3) The information processing apparatus according to (1) or (2), further including
an estimation unit that estimates a coming direction of a sending wave, the sending wave being sent from the transmission antenna, reflected on the target, and received by at least one of the plurality of reception antennas.

(4) The information processing apparatus according to any one of (1) to (3), in which
the generation unit generates the calibration parameter by projecting the phase difference vector on the reference phase difference vector.

(5) The information processing apparatus according to any one of (1) to (4), further including
a calculation unit that calculates a relative position between the target and each of the plurality of reception antennas.

(6) The information processing apparatus according to (5), in which the calculation unit converts the relative position of each of the plurality of reception antennas on a coordinate axis of the distance measurement sensor.

(7) The information processing apparatus according to any one of (1) to (6), further including
an execution unit that executes calibration on the basis of the calibration parameter.

(8) The information processing apparatus according to any one of (1) to (7), in which
the distance measurement sensor is mounted on a mobile apparatus.

(9) The information processing apparatus according to any one of (1) to (8), in which
the generation unit generates the calibration parameter on the basis of the phase difference vector and the reference phase difference vector, the phase difference vector being calculated on the basis of a plurality of sensing results from which the distance measurement sensor measures a plurality of targets.

(10) The information processing apparatus according to (2), in which
the measurement data is a plurality of pieces of measurement data from which a positional relationship between the distance measurement sensor and the target is acquired in different positional relationships.

(11) The information processing apparatus according to any one of (1) to (10), in which
the calibration parameter at least includes a parameter relating to a relative position and a relative angle of the distance measurement sensor with respect to a target to be measured.

(12) The information processing apparatus according to (11), in which
the calibration parameter at least includes parameters of six axes relating to relative positions of three axis directions of the distance measurement sensor and relative angles of the three axes, the three axis directions being orthogonal to one another.

(13) The information processing apparatus according to any one of (1) to (12), in which
the distance measurement sensor sends radio waves at extremely high frequencies (EHF) from the transmission antenna.

(14) The information processing apparatus according to any one of (1) to (13), in which
the target is in a still state.

(15) The information processing apparatus according to any one of (1) to (14), in which
relative position information of the target with respect to a reference point for calibration is unknown.

(16) The information processing apparatus according to any one of (1) to (15), in which
the target has a distance to the distance measurement sensor, the distance being shorter than a distance where aliasing due to phase difference characteristics occurs.

(17) An information processing method, including
by a computer system
generating a calibration parameter on the basis of a phase difference vector and a reference phase difference vector that is a reference, the phase difference vector being calculated on the basis of a sensing result, the sensing result being measured by a distance measurement sensor, the distance measurement sensor including a plurality of reception antennas and one or more transmission antennas, the plurality of reception antennas including a reference reception antenna and one or more other reception antennas, the phase difference vector being a phase difference vector between the reference reception antenna and each of the one or more other reception antennas.

(18) A program that causes a computer system to execute a step of generating a calibration parameter on the basis of a phase difference vector and a reference phase difference vector that is a reference, the phase difference vector being calculated on the basis of a sensing result, the sensing result being measured by a distance measurement sensor, the distance measurement sensor including a plurality of reception antennas and one or more transmission antennas, the plurality of reception antennas including a reference reception antenna and one or more other reception antennas, the phase difference vector being a phase difference vector between the reference reception antenna and each of the one or more other reception antennas.

REFERENCE SIGNS LIST 1 vehicle
54 millimeter-wave radar
110 calibration system
115 target
120 information processing apparatus
124 vector calculation unit
125 relative position calculation unit
126 relative angle estimation unit
127 parameter generation unit
128 calibration execution unit

The invention claimed is:

1. An information processing apparatus, comprising:
a generation unit configured to generate a calibration parameter based on a phase difference vector and a reference phase difference vector that is a reference, wherein
the phase difference vector is calculated based on a sensing result,
the sensing result is measured by a distance measurement sensor,
the distance measurement sensor includes a plurality of first reception antennas and one or more transmission antennas,
the plurality of first reception antennas includes a reference reception antenna and one or more second reception antennas,
the phase difference vector is a phase difference vector between the reference reception antenna and each of the one or more second reception antennas, and
the calibration parameter includes at least a parameter related to a relative position and a relative angle of the distance measurement sensor with respect to a target to be measured.

2. The information processing apparatus according to claim 1, wherein the sensing result includes measurement data that is the target to be used for calibration.

3. The information processing apparatus according to claim 2, wherein the measurement data is a plurality of pieces of measurement data from which a positional relationship between the distance measurement sensor and the target is acquired in different positional relationships.

4. The information processing apparatus according to claim 1, further comprising an estimation unit configured to estimate a direction of arrival of a sending wave, wherein the sending wave is sent from a transmission antenna of the one or more transmission antennas, reflected on the target, and received by at least one of the plurality of first reception antennas.

5. The information processing apparatus according to claim 1, wherein the generation unit is further configured to generate the calibration parameter based on projection of the phase difference vector on the reference phase difference vector.

6. The information processing apparatus according to claim 1, further comprising
a calculation unit configured to calculate a relative position between the target and each of the plurality of first reception antennas.

7. The information processing apparatus according to claim 6, wherein the calculation unit is further configured to convert the relative position of each of the plurality of first reception antennas on a coordinate axis of the distance measurement sensor.

8. The information processing apparatus according to claim 1, further comprising
an execution unit configured to execute calibration based on the calibration parameter.

9. The information processing apparatus according to claim 1, wherein the distance measurement sensor is mounted on a mobile apparatus.

10. The information processing apparatus according to claim 1, wherein
the generation unit is further configured to generate the calibration parameter based on the phase difference vector and the reference phase difference vector,
the phase difference vector is calculated based on a plurality of sensing results from which the distance measurement sensor measures a plurality of targets, and
the plurality of targets includes the target to be measured.

11. The information processing apparatus according to claim 1, wherein
the calibration parameter further includes parameters of six axes related to relative positions of three axis directions of the distance measurement sensor and relative angles of the three axes, and
the three axis directions mutually orthogonal.

12. The information processing apparatus according to claim 1, wherein the distance measurement sensor transmits radio waves at extremely high frequencies (EHF) from each of the one or more transmission antennas.

13. The information processing apparatus according to claim 1, wherein the target is in a still state.

14. The information processing apparatus according to claim 1, wherein relative position information of the target with respect to a reference point for calibration is unknown.

15. The information processing apparatus according to claim 1, wherein the target has a distance to the distance measurement sensor where aliasing due to phase difference characteristics occurs.

16. An information processing method, comprising:
by a computer system:
generating a calibration parameter based on a phase difference vector and a reference phase difference vector that is a reference, wherein
the phase difference vector is calculated based on a sensing result,
the sensing result is measured by a distance measurement sensor, the distance measurement sensor includes a plurality of first reception antennas and one or more transmission antennas, the plurality of first reception antennas includes a reference reception antenna and one or more second reception antennas, the phase difference vector is a phase difference vector between the reference reception antenna and each of the one or more second reception antennas, and the calibration parameter includes at least a parameter related to a relative position and a relative angle of the distance measurement sensor with respect to a target to be measured.

17. A non-transitory computer-readable medium having stored thereon, computer-executable instructions which, when executed by a computer, cause the computer to execute operations, the operations comprising:

generating a calibration parameter based on a phase difference vector and a reference phase difference vector that is a reference, wherein the phase difference vector is calculated based on a sensing result, the sensing result is measured by a distance measurement sensor, the distance measurement sensor includes a plurality of first reception antennas and one or more transmission antennas, the plurality of first reception antennas includes a reference reception antenna and one or more second reception antennas, the phase difference vector is a phase difference vector between the reference reception antenna and each of the one or more second reception antennas, and the calibration parameter includes at least a parameter related to a relative position and a relative angle of the distance measurement sensor with respect to a target to be measured.

* * * * *